Figure 1:
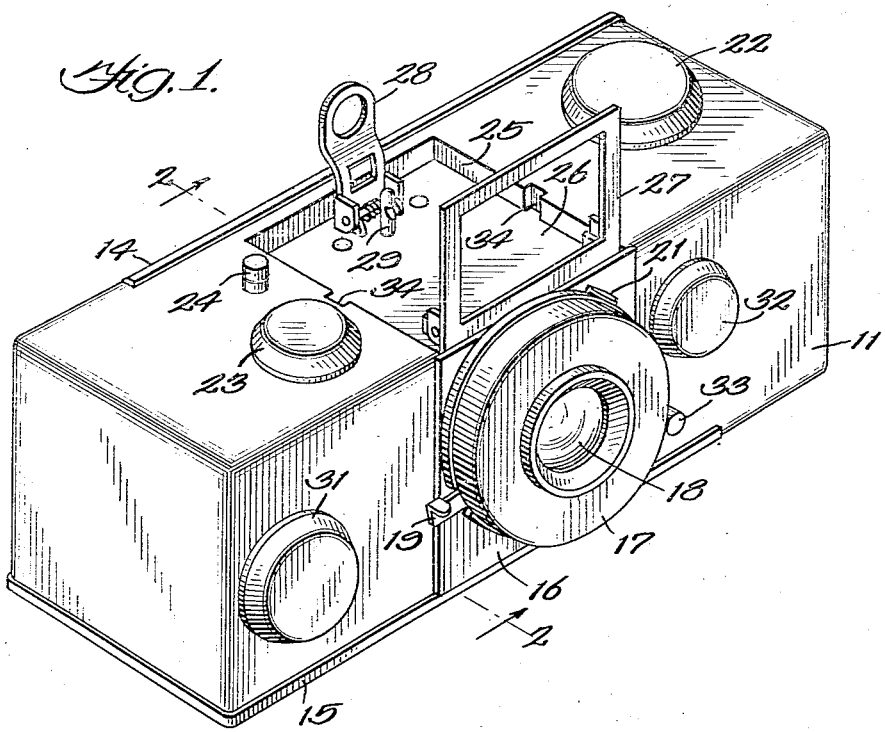

March 19, 1946.　　E. F. McDONALD, JR., ET AL.　　2,396,869
ROLL FILM CAMERA
Filed May 17, 1943　　2 Sheets-Sheet 1

Inventors:
Eugene F. McDonald Jr.
Kurt Emde
By
J. Clarke Hagey
Atty

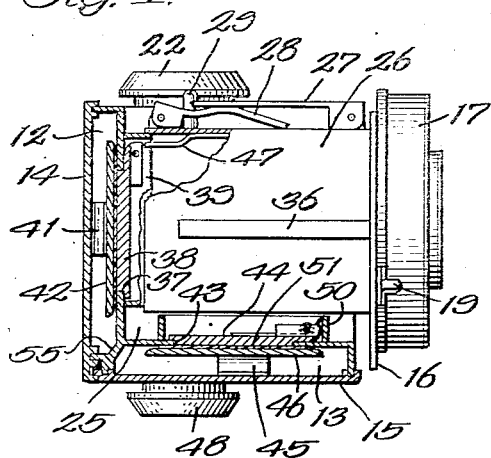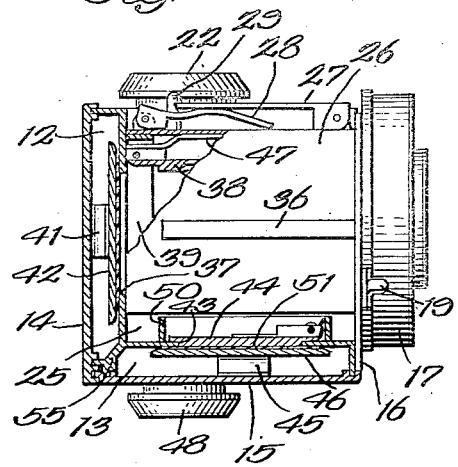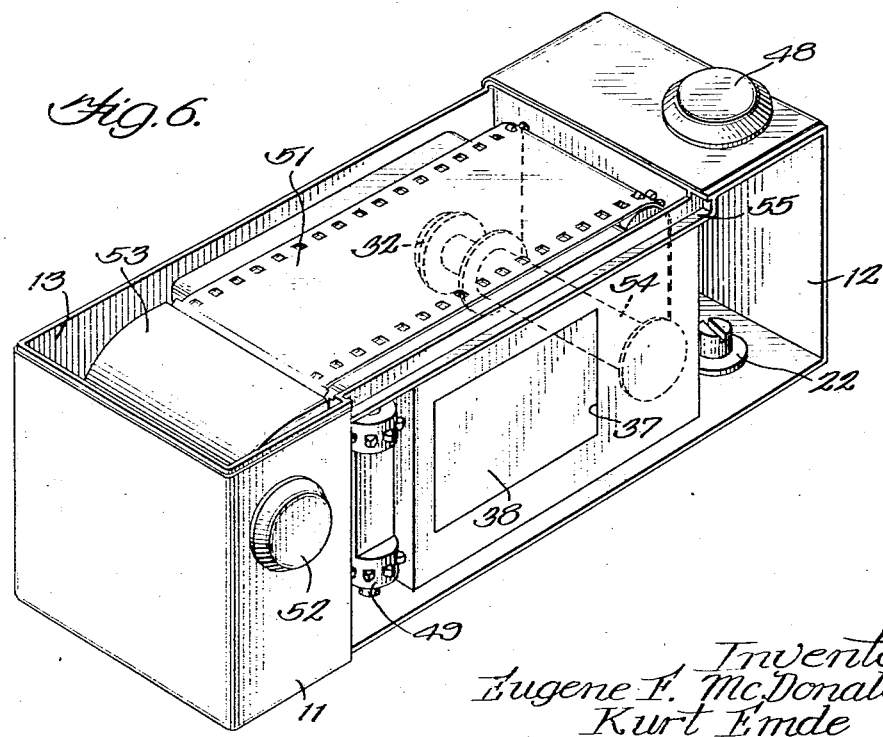

Patented Mar. 19, 1946

2,396,869

UNITED STATES PATENT OFFICE 2,396,869

ROLL FILM CAMERA

Eugene F. McDonald, Jr., Chicago, and Kurt Emde, Itasca, Ill., assignors to Eastman Kodak Company, Rochester, N. Y., a corporation of New Jersey Application May 17, 1943, Serial No. 487,228

13 Claims. (Cl. 95—31)

This invention relates to roll film cameras and, more particularly, to roll film cameras adapted for selective exposure to either of two rolls of film of different characteristics carried by said camera.

Heretofore, cameras have been available which provided for the selective exposure of different types of film. Generally such cameras, however, have been of the plate type with which different plates or different cut film holders or film backs might be used in order to successively expose different types of film, thereby to obtain exposures under widely varying light conditions. In roll film cameras, however, there always has been the limitation that an entire roll of film must be exposed before another film of a different type or different sensitivity could be used in the camera. With the advent of "Mini-cam" photography the thirty-five millimeter film camera became very popular. Black-and-white film for such cameras generally is available in eighteen or thirty-six exposure lengths. Kodachrome film is available for use in these same cameras for obtaining colored film transparencies. Frequently the owner of such camera is confronted with the desirability of taking a particular type of picture and yet his camera is loaded with the unwanted type of film.

A few suggestions have been made to provide cameras using roll films, whereby either of several films of different sensitivity could be used in successive frame exposures. Generally, however, such arrangements have had the disadvantage of being cumbersome or requiring special manipulation. In still another suggested form a removable lens was arranged to be used with either one of two film containing compartments. Such an arrangement involved the use of manually operable light gates which must be opened and closed in inserting or removing the lens holder from cooperative position with one of the film carrying compartments. One of the features of the thirty-five millimeter film camera is its compactness, ease of handling, and general versatility. It of course would be highly desirable if, without sacrificing these features, there could be provided a camera of this type which would provide for the selective exposure of film frames from either of two rolls of film of different characteristics carried by the camera.

It is therefore an object of the present invention to provide an improved compact roll film camera adapted for selective exposure of frames from either of two rolls of films of different characteristics.

It is another object of this invention to provide an improved compact roll film camera utilizing a single optical exposure system adapted for selective exposure of frames from either of two rolls of films of different characteristics.

Still another object of the present invention is to provide a compact roll film camera having two separate similar film compartments forming an integral part of the camera and being arranged at right angles to each other, with means for selective exposure of frames from either of the films carried by said compartments.

In accordance with the present invention there is provided a compact roll film camera having two separate similar film compartments arranged in planes at right angles to each other for selective exposure to frames from either of the films carried by these compartments. To enable this selective exposure of either of the films, each film compartment is provided with a film exposing opening or frame having a light gate therefor biased towards closure. An optical exposure system which may include a lens, a shutter and lens focusing means, is provided with means for controlling the operation of one of the light gates when the optical exposure system is in operative position with respect to a particular film compartment. Preferably the optical exposure system and cooperating apparatus is also provided with a view finder which is properly positioned with respect to the film compartment to be used. In accordance with the present invention no new additional operational procedure need be learned by the user of the improved camera who already is familiar with cameras of this type utilizing single roll film. The improved camera with the selectively positioned optical system is self-contained, compact, and not much larger than a single film camera using the same size film. Because the camera is self-contained when the optical system is in operative position, there is no necessity for carrying accessories such as film holders or the need for operating film holder slides or light gates or other apparatus which, when not operated in accordance with a certain operational procedure, results in the loss of at least one frame of film. Each film compartment is provided with film spool receiving means for unexposed film, film takeup means for the exposed film, and a film transport mechanism. If desired the film transport mechanism may also be constructed to include what is commonly called a film or exposure counter. View finders or range finders corresponding to the types commonly used with cameras using thirty-five millimeter film may be provided for the present camera.

Other and further objects of the invention will subsequently become apparent. The novel features believed to be characteristic of the invention are set forth with particularity in the appended claims.

Figure 2:
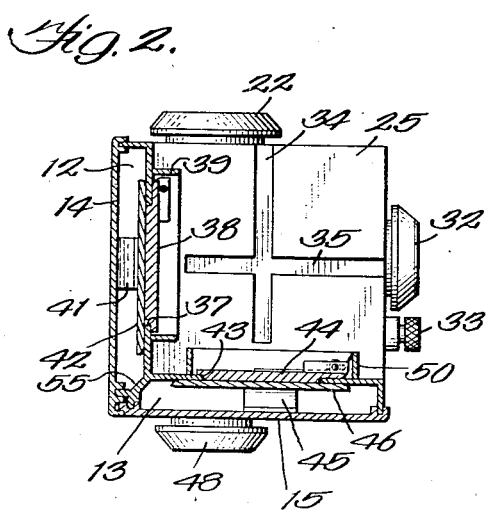
Figure 3:
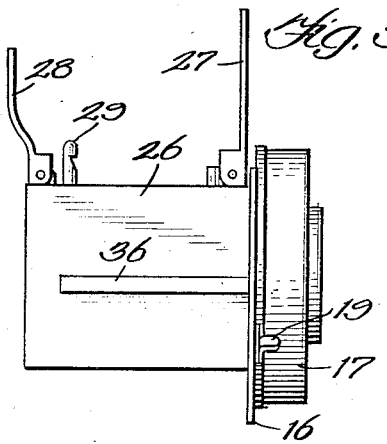

The invention, both as to its organization and method of operation, together with further objects and advantages thereof, will be understood readily by reference to the following description taken in connection with the accompanying drawings in which Figure 1 is a perspective view of a roll film camera embodying the present invention; Fig. 2 is a cross-sectional view of the camera of Fig. 1 as seen in the direction of the arrows along the plane 2—2; Fig. 3 is a side view of the central portion of the camera which comprises a dark box, a view finder, and an optical exposure system; Figs. 4 and 5 are cross-sectional views, similar to the cross-sectional view of Fig. 2, which serve to illustrate the cooperative relation between the central portion of the camera and the light gate associated with one of two film compartments; and Fig. 6 is a perspective view of the opposite sides of the camera from those shown in Fig. 1, with the removable backs removed from each of the film compartments.

Referring more particularly to Figs. 1 and 2, there is shown a roll film camera having a frame 11 which has two integrally formed roll film compartments 12 and 13, similar to each other and arranged in planes at right angles to each other. Each of the film compartments 12 and 13 are provided with removable back plates 14 and 15, respectively, by which access may be had to the film compartments for inserting and removing film. On the exterior of the side of the camera frame 11, as seen in Fig. 1, which may be conveniently called the front of the camera, there is visible a lens board 16 which supports a suitable optical exposure mechanism which may include a shutter mechanism 17 and a lens 18. The lens board 16 may also support suitable focusing means for the lens 18, but for simplicity in disclosure no focusing means is shown as would be the case where the lens 18 is a universal focusing lens. The outer casing of the optical exposure system may have extending therefrom a shutter release lever 19 and a shutter or exposure timing lever 21. Of course, other means may also be provided for regulating the opening of the iris associated with the lens 18 and the shutter.

The top of the camera as seen in Fig. 1 shows at the back side thereof one flange of the rear cover 14 for the film compartment which is in cooperative relation to the optical exposure system 17. The top of the camera also shows a knob 22 by which the exposed film is transported and wound upon a suitable film spool. Another knob 23 located at the other end of the camera is one of the film spool supporting members, upon which spool the unexposed film is supported. Preferably the camera is also provided with a film transport mechanism having an operating member 24 extending above one surface of the camera. This film transporting mechanism comprises suitable apparatus whereby the exposed film is transported a distance slightly greater than the exposed frame, thereby to position a new unexposed portion of the film in the focal plane of the camera. It, of course, would also be desirable to have the film transport mechanism include an indicator or other apparatus commonly known in the art as a film or exposure counter. This, for purposes of simplicity, is not shown since any one of such devices may be utilized. In the central portion of the frame 11 of the camera there is provided a cubical recess 25 which receives an open-ended dark box 26, the other end of which supports the lens board 16. The top of the dark box 26 which is visible in Fig. 1 may be provided with front and rear view finder frames 27 and 28 which preferably are spring-biased to the position shown. The front and rear viewing frames 27 and 28 may be folded down into the portion of the recess 25 seen in Fig. 1 and retained in position by a suitable resilient or spring-biased catch member 29. The folded down position of the view finder is shown in Figs. 4 and 5.

At what is seen as the front surface of the camera in Fig. 1, there also appears a knob 31 by which film may be transported in the other film compartment 13. A knob 32 constitutes part of the film spool supporting means similar to the knob 23. A portion of the film transport member 33 is also visible in Fig. 1. These members are for use when the optical exposure system 17 is in a plane ninety degrees from that shown in Fig. 1. Such position is obtained by removing from the cubical recess 25 the dark box 26, and reinserting it in the cubical recess so that what formerly was the front of the camera now becomes the top of the camera. Opposite walls of the recess 25 are each provided with two transversely disposed grooves 34 and 35 which engage cooperating means on the sides of the dark box 26 so as to maintain the optical exposure system 17 in a plane parallel to the plane of the film to be exposed.

The dark box 26, as seen in Fig. 3, shows one of the two sides, each of which is provided with a guide member or guide bar 36 adapted to fit into and to cooperate with the guide slots 34 and 35 of the cubical recess 25. Reference may now be had to Figs. 2, 3, 4 and 5, wherefrom it will be seen how the dark box 26 is arranged to cooperate with the camera frame and the recess 25 so as to provide an arrangement whereby frames of either of two different films supported within the camera may be exposed. Each of the film compartments is provided with a film exposing frame and a cooperating spring-biased light gate. Thus the film compartment 12 has a film exposing frame 37 and a cooperating light gate 38. Surrounding the exposing frame 37 and the light gate 38 is a suitable rectangular collar 39 which cooperates with the interior of the open end of the dark box 26 so as to provide a light-tight joint between the end of the dark box 26 and the film chamber 12. The removable back 14 of the film chamber 12 is provided with a resilient member 41 which supports a film engaging plate 42 which serves to hold the film to be exposed against the exposing window or frame 37. The film is thus maintained in the focal plane of the camera.

The film compartment 13 is similarly provided with an exposing window or frame 43 which has a cooperating light gate 44. The back cover 15 of the film compartment 13 is provided with a resilient spring member 45 which supports a film engaging plate 46 which maintains the film to be exposed in the focal plane of the camera when this film compartment is arranged in cooperative relation to the optical exposure system 17. The film exposing window 43 and its cooperating light gate 44 are surrounded by a rectangular collar or shield 50 which cooperates with the interior of the dark box 26 to provide a light-tight connection between the box and the film compartment.

Adjacent the open-end of the dark box 26 there is provided a plurality of light gate engaging members 47 which in Fig. 4 is shown at a position where one of these members is about to engage a portion of the light gate 38 which extends beyond its pivotal or hinge supporting connection. When the dark box 26 is moved further into the recess 25, the end of the member 47 will engage the light gate 38 thereby to cause it to be swung inwardly into the dark box 26 into a position substantially parallel to and adjacent the top of the dark box. This position is shown in Fig. 5. With the dark box in the position shown, it will be seen that the optical exposure system 17 is now in cooperative relation with respect to the film chamber 12 and the film contained therein, so that exposure may be made of the film. If it is desired to position the optical exposure system so as to cooperate with the film compartment 13, the dark box 26 is removed from the recess 25 and the dark box is rotated through a distance corresponding to a rotation of ninety degrees in one plane and a rotation of one hundred and eighty degrees in a plane perpendicular thereto so that, as seen in Figs. 2 and 4, the dark box 26 will have the lens board at the top and the view finder to the right, so that now the guide 36 is inserted in the guide groove or slot 34, whereupon the dark box is moved downwardly in cooperative relation to the film exposing frame 43 and the light gate 44. The projecting members 47 within the dark box 26 therefore engage that portion of the light gate 44 extending to the right of the pivotal or hinge supporting connection so as to cause the light gate 44 to be opened. From this it will become apparent that if, for example, the film compartment 12 were loaded with black-and-white film, and the film compartment 13 were loaded with a different film, such as Kodachrome, that successive exposures might be made on each of these films. The only manipulation required is the withdrawal of the dark box 26 from one position and the insertion of the box into another position. The projecting members 47 within the dark box 26 may also be arranged to frictionally hold the dark box in cooperative relation with respect to the body of the camera. From the disclosure of Fig. 4 it will be seen that prior to the time that the dark box is completely inserted into the recess 25, the surrounding structure 39 cooperates with the inner portion of the dark box so as to provide a light-tight joint. The dark box therefore has all light excluded therefrom prior to the initial actuation of the corresponding light gate which protects the unexposed film. When the box is withdrawn the light gate closes prior to the time that any light can enter into the dark box.

Fig. 6 is a perspective view showing the film compartments 12 and 13 with the backs 14 and 15 removed therefrom. The film compartment 12 is shown empty, without any film. To the extreme right on the inside is shown the inner portion of the mechanism attached to the knob 22. Opposite this knob is another cooperating knob-like member 48. It may be assumed that the dark box has been removed from the recess so that the light gate 38 is in closed position. Just beyond the light gate 38 there is shown a film sprocket 49 which comprises a portion of the film transport mechanism 24, seen in Fig. 1. To the rear of the sprocket 49, which is arranged or otherwise mounted so as to be removable, there is provided a film spool supporting means upon which a roll of unexposed film may be supported. The other film compartment 13 shows a film 51 in position across the exposure frame window and light gate. The bottom knob 52 which cooperates with the knob 31 of Fig. 1 appears toward the front side in Fig. 6. Between the knobs 31 and 52 there may be mounted a film cartridge or container 53, such as is commonly used for receiving the exposed film. Shown in dotted lines is the knob 32 which engages a suitable film spool 54. The compartments 12 and 13 are separated from each other by the arrangement of the compartments and the partition 55. From this figure it also will become apparent that the film compartments are similar to each other, are separated, and constitute a portion of the frame 11 of the camera.

It is believed that from the foregoing description it will be apparent that there has been provided a compact roll film camera which is not much larger than a single roll film camera, which is arranged for the selective exposure of frames from either of two rolls of films of different characteristics housed in the film compartments 12 and 13. With the optical exposure system 17 in the position shown in Fig. 1, the film contained in the film compartment 12 may be exposed because the dark box 26, by virtue of the projecting fingers 47, has removed the protective light gate 38 from the film. If now it is desired to expose a frame or film in the compartment 13, the dark box 26 is removed from its position in the cubical recess 25 wherein it has been frictionally retained, and the box is turned around and inserted so that the guides 36 enter into the slots 34, visible from the top of the camera in Fig. 1. The camera body is then rotated so that the view finder comprising the frames 26 and 27 may be held in proper position with respect to the eye, and thus the other film may be exposed. By releasing the film transport members 24 or 33 appearing on the outer surfaces of the camera frame 11, the knobs 22 or 31 may be actuated until further movement thereof is prohibited by the film transport means which permits the film to be moved only a distance sufficient to bring into alignment a new frame of unexposed film.

While a single preferred embodiment of the present invention has been shown in the drawings, it is to be understood that variations may be made therein and in the instrumentalities employed, without departing from the spirit and scope of the invention as set forth in the appended claims.

What is claimed is:

1. A roll film camera adapted for selective exposure of film frames from either of two rolls of film of different characteristics, said camera having two separate similar film compartments arranged at right angles to each other, a single optical exposure system adapted for selective movement into either of two planes at right angles to each other for cooperation with a selected one of said film compartments, each compartment being provided with a focal plane film exposing frame fitted with a hinged movable light gate spring-biased to a normal position lying against said focal plane film exposing frame, each compartment being provided with a removable light-tight back to permit insertion and removal of film, means for insuring the positioning of said optical system in a plane parallel to a selected film, and means carried by the optical system for engaging and moving the hinged movable light gate away from the focal plane exposing frame when the optical system is moved into position to expose said frame.

2. A roll film camera adapted for selective exposure of either of two films contained therein comprising a frame having two similar independent film compartments arranged at right angles to each other, each film compartment being provided with a film exposing frame fitted with a spring-biased light gate, said camera frame having intermediate its ends a cubical recess communicating with said exposure frames and light gates, a separate open-ended dark box having a lens board at one end, said dark box being adapted to be inserted in either of two positions within said cubical recess, and means mounted within said dark box for actuating one of said light gates when said dark box is inserted in said cubical recess.

3. A roll film camera adapted for selective exposure of either of two different films contained therein comprising a frame having two similar independent film compartments arranged at right angles to each other, each film compartment being provided with film spool holders, film winding means, film transport means, a removable back, and a film exposing frame fitted with a spring-biased light gate, said camera frame having intermediate its ends a cubical recess provided at each of two opposite sides with transverse guide members, said sides being at right angles to the surfaces communicating with said exposure frames and light gates, and a separate open-ended dark box having a lens board at one end and guide means for cooperation with the transverse guide members of said cubical recess, and means mounted within said dark box for actuating one of said light gates when said dark box is inserted in said cubical recess.

4. A roll film camera adapted for selective exposure of either of two different films contained therein by a single optical exposure system comprising a frame having two similar separate film compartments arranged at right angles to each other, each film compartment being provided with a film exposing frame fitted with a spring-biased light gate, said camera frame having intermediate its ends a cubical recess communicating with said exposure frames and light gates, a separate open-ended box having an optical exposure system at one end, said box being adapted to be inserted in either of two positions within said cubical recess, means mounted within said box for actuating one of said light gates when said box is inserted in said recess and for retaining in position said box within said recess, and a view finder mounted on the top of said box.

5. A roll film camera adapted for selective exposure of either of two different films contained therein by a single optical exposure system comprising a frame having two similar separate film compartments arranged at right angles to each other, each film compartment being provided with a film exposing frame fitted with a spring-biased light gate, said camera frame having intermediate its ends a cubical recess communicating with said exposure frames and light gates, a separate open-ended box having an optical exposure system at one end, said box being adapted to be inserted in either of two positions within said cubical recess, means mounted within said box for actuating one of said light gates when said box is inserted in said recess and for retaining in position said box within said recess, a view finder mounted on the top of said box, and means for insuring a light-tight connection between the open end of said box and the film exposing frame of an associated actuated light gate.

6. A compact roll film camera adapted for selective exposure of frames from either of two roll films of different characteristics comprising a frame having two separate similar film compartments arranged in planes at right angles to each other, said frame having a centrally disposed cubical recess, a dark box having an open end and opposite said open end an optical exposure system, said dark box being adapted to fit within said recess, each compartment being provided with a film exposing opening having a light-tight gate therefor biased towards closure, said opening forming a portion of said recess, two opposing sides of said recess each having two guide grooves at right angles to each other, two guide members arranged on opposite sides of said dark box for cooperation with said grooves to maintain said optical exposure system parallel to one of said films, means surrounding each light gate for excluding light from said dark box when in operative position with respect to said light gate, and means carried by said dark box for actuating said light gate when said dark box is in operative position.

7. A compact roll film camera adapted for selective exposure of frames from either of two roll films of different characteristics comprising a frame having two separate similar film compartments arranged in planes at right angles to each other, said frame having a centrally disposed cubical recess, a dark box having an open end and opposite said end an optical exposure system, said dark box being adapted to fit in said recess, each compartment having a light gate normally biased towards closure, two opposing sides of said recess each having two guide grooves at right angles to each other, two guide members arranged on opposite sides of said dark box for cooperation with said grooves to maintain said optical exposure system parallel to one of said films, means surrounding each light gate for excluding light from said dark box when in operative position with respect to said light gate, and means carried by said dark box for actuating said light gate when said dark box is in operative position.

8. A compact roll film camera adapted for selective exposure of frames from either of two roll films of different characteristics comprising a frame having two separate similar integrally formed film compartments arranged in planes at right angles to each other, said frame having a centrally disposed cubical recess, an open-ended dark box having at the other end an optical exposure system, a view finder carried by said dark box, said dark box being adapted to fit within said recess, each compartment being provided with a film exposing opening having a light gate therefor biased towards closure, two opposing sides of said recess each having two guide grooves at right angles to each other, two guide members arranged on opposite sides of said dark box for cooperation with said grooves, means surrounding each light gate for excluding light from said dark box when in operative position with respect thereto, and means positioned within said dark box for actuating the light gate to open position when said dark box is in operative position.

9. A compact roll film camera adapted for selective exposure of frames from either of two different films comprising a frame having two separate film compartments arranged in planes at right angles to each other, said frame having a centrally disposed cubical recess for supporting a dark box, said dark box having an open end and an opposite end provided with an optical exposure system, each compartment being provided with a film transport mechanism and a film exposing opening having a light gate therefor biased towards closure, said exposing opening being positioned in one wall of said recess, two opposing walls of said recess each having two guide grooves at right angles to each other, two horizontal guide bars arranged on opposite sides of said dark box for cooperation with said grooves, means surrounding each of said exposing openings for producing a light-tight joint with said dark box when in operative position, and means positioned within said dark box for actuating the light gate to open position and to retain frictionally said dark box in operative position.

10. A compact roll film camera adapted for selective exposure of frames from either of two different films comprising a frame having two separate similar integrally formed film compartments arranged at right angles to each other, each compartment being provided with unexposed film spool receiving means at one end, exposed film spool receiving means at the other end, a recess in the frame between the two ends, means for holding flat a film frame to be exposed, a film transport mechanism and a film exposing opening having a light gate therefor biased towards closure, said opening and said gate forming a portion of one wall of said recess, two opposing sides of said recess each having guide grooves at right angles to each other, horizontal guide bars arranged on opposite sides of said dark box for cooperation with said grooves, means for excluding light from said dark box when in operative position, and means positioned within said dark box for actuating the light gate to open position when said dark box is in operative position and to retain frictionally said dark box in said position.

11. A compact roll film camera adapted for selective exposure of frames from either of two different films comprising a frame having two separate similar integrally formed film compartments arranged at right angles to each other, each compartment being provided with unexposed film spool receiving means at one end, exposed film spool receiving means at the other end, a recess in the frame between the two ends, means for holding flat a film frame to be exposed, a film transport mechanism, a film exposing opening having a light gate therefor biased towards closure, a removable light-tight back to permit insertion and removal of film from the compartment, said opening and said gate forming a portion of one wall of said recess, two opposing sides of said recess each having guide grooves at right angles to each other, horizontal guide bars arranged on opposite sides of said dark box for cooperation with said grooves, means for excluding light from said dark box when in operative position, and means positioned within said dark box for actuating the light gate to open position when said dark box is in operative position and to retain frictionally said dark box in said position.

12. A roll film camera adapted for selective exposure of film frames from either of two rolls of film of different characteristics carried by said camera, said camera having two separate similar film compartments and a single optical exposure system adapted for selective cooperation with either of said film compartments, said film compartments being arranged at right angles to each other, each film compartment being provided with a focal plane film exposing frame, a movable light gate pivotally mounted along one edge thereof and spring pressed toward the frame to protect the film against exposure to light, except when said optical system is in operative position relative to said compartment, means permitting the shifting of said optical system into a plane parallel to a selected film, and a gate engaging member carried by the single optical exposure system and positioned to engage and move the gate when said single optical exposure system is moved into an operative position in a plane parallel to a selected film for actuating the light gate away from the film to be exposed.

13. A roll film camera adapted for selective exposure of film frames from either of two rolls of film carried by said camera, two separate similar film compartments having walls forming a rectangular shape opening carried by the camera, a single optical system carried by said camera and including rectangular walls adapted for selective cooperation with and slidable into either of the rectangular shaped openings of said film compartments, a gate moving arm carried by a rectangular wall of said single optical system, said film compartments being arranged at right angles to each other, a focal plane film exposing frame for each film, means for excluding light from a focal plane film exposing frame comprising a light tight gate mounted for movement to and from a light sealing position with respect to the frame, said means being movable through contact by said gate moving arm carried by a rectangular wall portion of said single optical system to permit light to pass to a selected focal plane exposing frame when said optical system is moved towards the selected focal plane exposing frame so that a rectangular wall of the single optical system at least partially telescopes a rectangular-shaped opening to form a light obstructing connection therewith.

EUGENE F. McDONALD, Jr.
KURT EMDE.